(12) United States Patent
Lin et al.

(10) Patent No.: US 10,878,078 B2
(45) Date of Patent: Dec. 29, 2020

(54) SYSTEM NOTIFICATION SERVICE CONTROL METHOD, APPARATUS, TERMINAL DEVICE, AND STORAGE MEDIUM

(71) Applicant: GUANGDONG OPPO MOBILE TELECOMMUNICATIONS CORP., LTD., Guangdong (CN)

(72) Inventors: Zhiyong Lin, Guangdong (CN); Bing Du, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 209 days.

(21) Appl. No.: 16/116,399

(22) Filed: Aug. 29, 2018

(65) Prior Publication Data
US 2019/0156014 A1    May 23, 2019

(30) Foreign Application Priority Data
Nov. 21, 2017    (CN) .......................... 2017 1 1168347

(51) Int. Cl.
*H04L 9/32*    (2006.01)
*G06F 21/44*    (2013.01)
(Continued)

(52) U.S. Cl.
CPC .............. *G06F 21/44* (2013.01); *G06F 21/45* (2013.01); *G06F 21/51* (2013.01); *G06F 21/52* (2013.01);
(Continued)

(58) Field of Classification Search
CPC . H04L 9/32; H04L 63/12; G06F 21/44; G06F 21/30
See application file for complete search history.

(56) References Cited

U.S. PATENT DOCUMENTS

| | | | |
|---|---|---|---|
| 2014/0013429 A1 | 1/2014 | Lu | |
| 2014/0100861 A1 | 4/2014 | Ledet | |

(Continued)

FOREIGN PATENT DOCUMENTS

| | | | |
|---|---|---|---|
| CN | 104991803 A | 10/2015 | |
| CN | 104991803 A | 10/2015 | ............. G06F 9/445 |

(Continued)

OTHER PUBLICATIONS

European Search Report (ESR) dated Feb. 22, 2019 for Application No. EP 18194031.3.
(Continued)

*Primary Examiner* — Izunna Okeke
(74) *Attorney, Agent, or Firm* — Ladas & Parry LLP

(57) ABSTRACT

A system notification service control method, apparatus, a terminal device, and a storage medium are described. The system notification service control method may include detecting whether an application initiates a registration for a system notification reading permission; in response to detecting that the application initiates the registration for the system notification reading permission, determining whether the application meets a registration condition; and prohibiting the application from registering for the system notification reading permission when the application does not meet the registration condition.

19 Claims, 4 Drawing Sheets

(51) Int. Cl.
  *G06F 21/56* (2013.01)
  *G06F 21/51* (2013.01)
  *G06F 21/55* (2013.01)
  *G06F 21/45* (2013.01)
  *G06F 21/52* (2013.01)
  *G06F 21/62* (2013.01)
  *H04L 29/06* (2006.01)
  *H04L 29/08* (2006.01)

(52) U.S. Cl.
  CPC ........... *G06F 21/554* (2013.01); *G06F 21/56* (2013.01); *G06F 21/6218* (2013.01); *H04L 63/101* (2013.01); *H04L 67/22* (2013.01); *G06F 2221/2141* (2013.01)

(56) References Cited

U.S. PATENT DOCUMENTS

| | | | | |
|---|---|---|---|---|
| 2015/0040246 A1* | 2/2015 | Yuen | ................ | H04W 12/0023 726/30 |
| 2015/0373048 A1* | 12/2015 | Siddiqui | ............... | H04L 67/125 713/151 |
| 2017/0103215 A1 | 4/2017 | Mahaffey et al. | | |

FOREIGN PATENT DOCUMENTS

| | | | | |
|---|---|---|---|---|
| CN | 105426754 A | 3/2016 | | |
| CN | 105955792 A | 9/2016 | | |
| CN | 105955792 A | 9/2016 | ............ | G06F 9/445 |
| CN | 106022101 A | 10/2016 | | |
| CN | 106022101 A | 10/2016 | | |
| CN | 106462697 A | 2/2017 | | |
| CN | 106802819 A | 6/2017 | | |
| CN | 106802819 A | 6/2017 | ............ | G06F 9/445 |
| CN | 107908953 A | 4/2018 | | |

OTHER PUBLICATIONS

International Search Report (ISR) and Written Opinion (WO) dated Feb. 28, 2019 for Application No. PCT/CN2018/116740.
English translation of CN 106462697 A.
English translation of CN 107908953 A.
English translation of CN 105955792 A.
English translation of CN 106022101 A.
Chinese Office Action dated Jul. 16, 2019 for Application No. CN 201711168347.7.
Indian Office Action with an English translation dated Oct. 3, 2020 for Application No. IN 201814043059.
EP Examination Report dated Oct. 13, 2020 for Application No. EP Application No. 18194031.3.

* cited by examiner

SYSTEM NOTIFICATION SERVICE CONTROL METHOD, APPARATUS, TERMINAL DEVICE, AND STORAGE MEDIUM

CROSS-REFERENCE TO RELATED APPLICATION

The present application claims priority to Chinese Patent Application No. 201711168347.7 filed on Nov. 21, 2017, the entire contents of which are hereby incorporated by reference.

TECHNICAL FIELD

The application relates to, but is not limited to, computer technology, and particularly to, but not limited to, a system notification service control method, apparatus, a terminal device, and storage medium.

BACKGROUND

With the increasing popularity of terminal devices, more and more users use terminal devices to perform various functions, such as reading texts, watching videos, listening to music, and playing games. As the functional capacity of terminal devices increases, the number of system applications and third-party applications installed in terminal device also increases.

Applications installed in a terminal device may self-start in the background or may start by other associated applications, and there is no effective relevant control mechanism yet. As a result, system operation efficiency may be reduced and power consumption of the terminal device may be reduced.

SUMMARY

Embodiments provide technical solutions for controlling applications, and in particular for controlling a system notification service.

In one aspect, a system notification service control method is provided. The method may include: detecting whether an application initiates a registration for a system notification reading permission; in response to detecting that the application initiates the registration for the system notification reading permission, determining whether the application meets a registration condition; and prohibiting the application from registering for the system notification reading permission when the application does not meet the registration condition.

In another aspect, a terminal device is provided. The terminal device may include a processor, and a memory storing a computer program that is executable by the processor to perform steps of: detecting whether an application initiates a registration for a system notification reading permission; in response to detecting that the application initiates the registration for the system notification reading permission, determining whether the application meets a registration condition; and prohibiting the application from registering for the system notification reading permission when the application does not meet the registration condition.

In yet another aspect, there is provided a non-transitory computer-readable storage medium containing instructions that are executable by a device processor to perform steps of: detecting whether an application initiates a registration for a system notification reading permission; in response to detecting that the application initiates the registration for the system notification reading permission, determining whether the application meets a registration condition; and prohibiting the application from registering for the system notification reading permission when the application does not meet the registration condition.

A better understanding of the nature and advantages of embodiments of the application may be gained with reference to the following detailed description and the accompanying drawings.

BRIEF DESCRIPTION OF DRAWINGS

The accompanying drawings are used to provide a further understanding of the technical solutions of the application and form a part of the specification, and together with the embodiments of the application, are intended to explain the technical solutions of the application, but do not constitute a limitation on the technical solutions of the application.

DETAILED DESCRIPTION

Embodiments provide methods and systems for controlling the operation of applications, and in particular for controlling a system notification service. The methods and systems may operate within the context of terminal devices, such as mobile computer, wearables, and smartphones.

At present, operating systems, such as the Android™ system, have become widely used mobile device operating system platform for users. Users install various third-party applications in a terminal device through the operating systems. Third-party applications use various approaches to maintain their operation on a terminal device. A large number of third-party applications start secretly in the background, consuming traffic of the user and battery power of the terminal device. Some illegal applications may also record private operation records of users. One way that third-party applications implement self-starting in the background is by using the operation mode of a system notification service and guiding users to open a notification reading permission of the Android™ system. Some applications, after being illegally started, wake up and start other third-party applications, which significantly reduces the operation efficiency of the terminal device and at the same time sharply increases the risk of disclosure of a user's private information.

Within the context of the present embodiments, principal functions of a system notification service (also called system notification management service or notification management service) may be to display the received short messages and instant messages (such as QQ, wechat, Sina, and short messages); display push messages of the client (such as new release, advertisement, and recommended news); and display things in progress (such as programs running in the background, music players, and download progress during version update). A third-party application may guide the user to open the notification reading permission to wake up his own application when the notification message changes. For example, in Android™ system, the notification reading permission may be "android.permission.BIND_NOTIFICATIONLISTENER_SERVICE". A principal function of the notification reading permission may be that the third-party application can obtain and monitor various notifications of the Android™ system by opening this permission. At the same time, the third-party application may also need to implement a service to monitor the notification information of the system. The service may register with the system notification management service. At this time, when the notification changes, the system notification management service may call back the service. If the third-party application process is not started at this moment, it may be started by the system notification management service, thus causing hidden problems with terminal operation efficiency and security.

Figure 1:
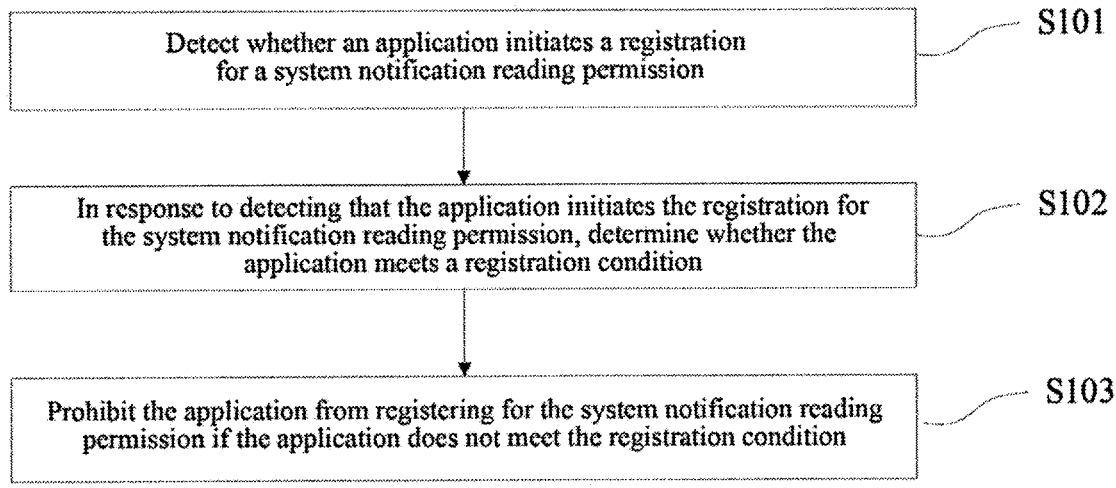
FIG. 1 is a flowchart of a system notification service control method according to an embodiment of the present application.

FIG. 1 is a flowchart of a system notification service control method according to an embodiment of the present application. As shown in FIG. 1, the method may include steps S101-S103.

As shown, the method may begin in step S101 by detecting whether an application initiates a registration for a system notification reading permission.

In an exemplary embodiment, whether an application initiates registration for the system notification reading permission may be determined when the application is started to run. The starting and running of an application may include an installation process and/or update process of the application. For example, the application may acquire corresponding permissions during the installation process, such as photographing permission, address book acquisition permission, or reading system notification permission. When the application is installed or updated, whether the application initiates registration for the system notification reading permission may be determined. Illustratively, in Android™ system, whether the application calls the notification management service for registering for the system notification reading permission may be determined during the installation process of the application.

If the application initiates the registration for the system notification reading permission, the method of FIG. 1 continues in step S102 by determining whether the application meets the registration condition.

In an exemplary embodiment, if it is detected that the registration for the system notification reading permission is initiated during the installation or update of the application, whether the application meets the registration condition is determined. Herein, embodiments may detect that the application registers for the service process in the notification management service. The registration condition is a basis preset for determining whether the current application can register for the system notification reading permission.

In an exemplary embodiment, if the initiation of registration for the system notification reading permission is not detected during the installation or update process of the application, the flow ends.

In an exemplary embodiment, determining whether the application meets the registration condition includes determining whether the identification of the application is recorded in a whitelist. The whitelist may include one or more of: a whitelist received from a server, a whitelist received from another terminal device, a whitelist input by a user, a whitelist generated by a terminal device according to a usage record of applications in the terminal device, or a whitelist generated by a terminal device according to a usage record of applications received from at least one other terminal device.

In an exemplary embodiment, a server may determine a whitelist containing identifications of applications and send it to a terminal device. Alternatively, a terminal device may receive a whitelist from another terminal device, or the whitelist may be input by a user.

In an exemplary embodiment, the whitelist may be generated by a terminal device according to a usage record of applications received from at least one other terminal device. For example, before determining whether the application meets the registration condition, usage records pushed by other terminal devices may be acquired and used to create a whitelist that contains application identifications according to the usage records, and the whitelist may be stored. Acquiring usage records of other terminal devices may include acquiring one or more types of data, such as starting time, starting frequency, or running time length, of installed applications pushed by other terminal devices.

In an exemplary embodiment, a terminal device determines whether to add an application to the whitelist based on the usage record of the application on the terminal device. For example, the terminal device may monitor a usage record of the application after the application is installed, and may determine whether to add the application to the whitelist. When the application is installed again or updated, the terminal device may determine that the application is in the whitelist and thus allow the application to register for notification reading permission. In addition, the terminal device may push the whitelist to other terminal devices.

In an exemplary embodiment, the server may determine a whitelist containing the application identification according to the uploaded whitelist or the usage record of applications uploaded by one or more terminal devices, and may push the whitelist to the terminal devices.

Alternatively, determining whether the application meets the registration condition may include determining whether the identification of the application is recorded in a blacklist. The blacklist may comprises any one or more of: a blacklist received from a server, a blacklist received from another terminal device, a blacklist input by a user, a blacklist generated by a terminal device according to information of applications monitored by the terminal device, or a blacklist generated by a terminal device according to information of applications monitored and sent by at least one other terminal device.

In an exemplary embodiment, before determining whether the application meets the registration condition, list information pushed by a server may be received. The list information records a registration prohibition list of applications that are prohibited from registering for notification services. The server may determine the registration prohibition list based on one or more types of data, such as the frequencies of reading system notification by applications and/or the advertisement pop-up frequencies of applications uploaded by one or more terminal devices. Alternatively, the blacklist may be received from another terminal device or input by a user.

The frequency for reading system notification by an application can be expressed by the ratio of the number of notifications read by the application to the number of notifications sent by the system. A very high ratio indicates that the application has read almost all types of notifications sent by the system. The frequency for reading system notification by an application can also be expressed in other ways such as the number of times for reading system notifications within a time period.

If the identification of the application is not recorded in the current blacklist, the application can register for system notification reading permission. After the registration, it may be possible that the application is added into the blacklist. In an exemplary embodiment, a process for generating a blacklist may involve: if the application meets the registration condition, performing registration for the system notification reading permission of the application; monitoring within a preset time period the frequency for reading the system notification by the application; and if the frequency is greater than a preset frequency, adding the application to the blacklist.

In an exemplary embodiment, the application may be added to the blacklist if the frequency for popping-up advertisements by the application is detected to be greater than a preset frequency within the preset time period for monitoring.

In an exemplary embodiment, a blacklist is generated by a terminal device according to information of applications, such as frequencies of reading system notification and/or frequencies of popping-up advertisements by applications, monitored and sent by at least one other terminal device.

In an exemplary embodiment, determining whether the application meets the registration condition may include receiving the list information sent by the server and using the contents recorded in the list information as the basis for determining whether the application can register for system notification reading permission. Illustratively, an embodiment may receive the list information pushed by the server. The list information records a registration prohibition list of applications that are prohibited from registering for notification services. The server may determine the registration prohibition list based on any one or more types of data, such as the frequencies for reading system notification by applications and/or advertisement pop-up frequencies of applications uploaded by one or more terminal devices.

If the application does not meet the registration condition, the method of FIG. 1 continues in step S103 by prohibiting the application from registering for the system notification reading permission.

In an exemplary embodiment, when it is determined that the application does not meet the registration condition, the application is prohibited from registering for the system notification reading permission. For example, the function method in the notification management service called by the application can be intercepted and shielded to prohibit the application from registering for the service process. Optionally, when a whitelist is used as a registration condition, if the application does not meet the registration condition, prohibiting the application from registering for the system notification reading permission may include prohibiting the application from registering for the system notification reading permission if the identification of the application is not recorded in the whitelist. Optionally, when a blacklist is used as a registration condition, prohibiting the application from registering for the system notification reading permission if the application does not meet the registration condition may include prohibiting the application from registering for the system notification reading permission if the identification of the application is recorded in the blacklist. When the list pushed by the server is used as a registration condition, determining whether the application meets the registration condition may include determining whether the identification (such as package name) of the application is recorded in the registration prohibition list. In an embodiment, prohibiting the application from registering for the system notification reading permission if the application does not meet the registration condition may include prohibiting the application from registering for the system notification reading permission if the identification of the application is recorded in the registration prohibition list.

As evident from the above content, embodiments may determine whether an application meets a registration condition when detecting that the application initiates a registration for the system notification reading permission, and if the application that does not meet the registration condition, prohibit the application from registering for the system notification reading permission, thereby preventing an illegal application from self-starting when being awakened by the system notification after registering for notification reading permission. In this manner, embodiments may improve the operating efficiency of the system, and reduce the power consumption of the terminal device.

Figure 2:
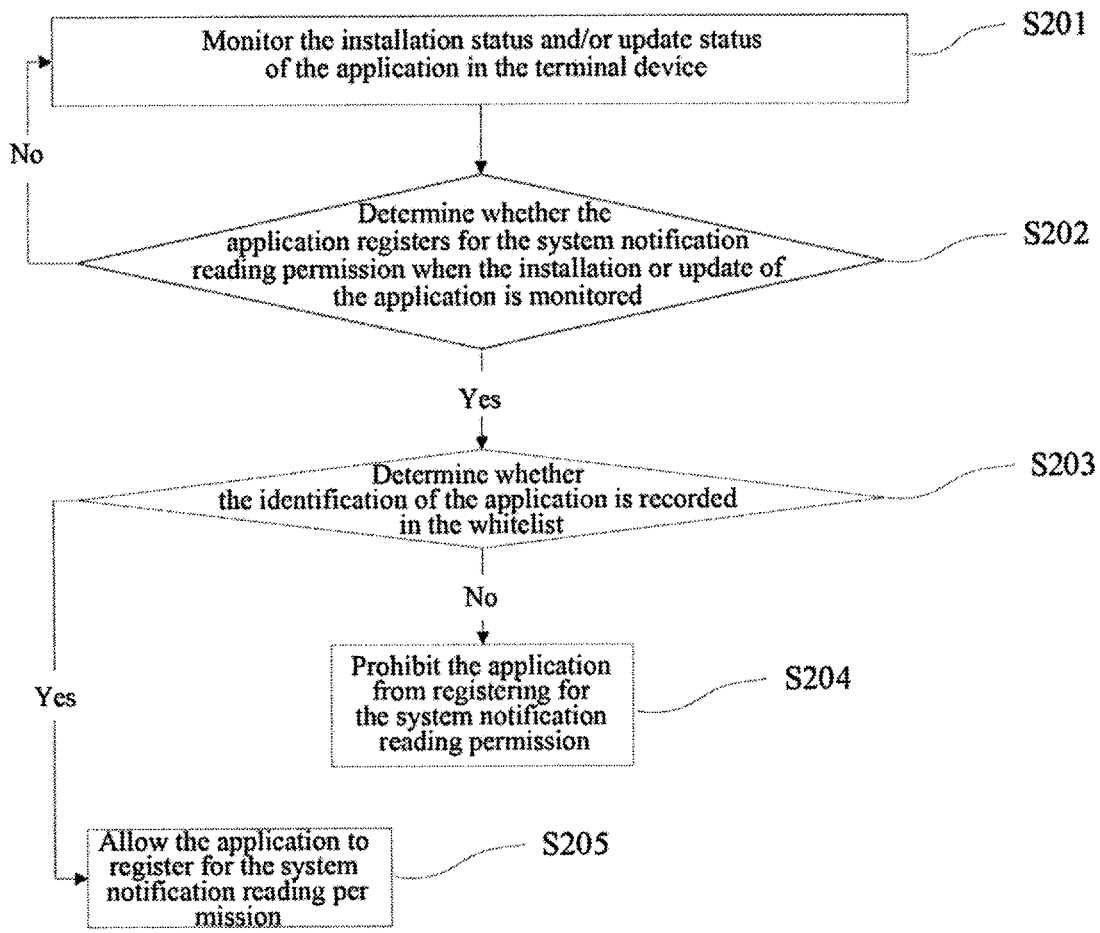
FIG. 2 is a flowchart of a system notification service control method according to an exemplary embodiment of the present application.

FIG. 2 is a flowchart of a system notification service control method according to an exemplary embodiment of the present application. In this exemplary embodiment, determining whether an application meets a registration condition may include determining whether the identification of the application is recorded in a whitelist. If the identification of the application is not recorded in the whitelist, then the application does not meet the registration condition, and is prohibited from registering for the system notification reading permission. As shown in FIG. 2, the method may include steps S201-S205.

As shown, the method may begin in step S201 by monitoring the installation status and/or update status of the application in the terminal device.

Based on that monitoring, the method of FIG. 2 continues in step S202 by determining whether the application registers for the system notification reading permission.

If the method determines that the application has not registered, the method returns to step S201 and continues monitoring.

If the method determines that the application registers for the system notification reading permission, then in step S203 the method continues by determining whether the identification of the application is recorded in the whitelist.

If the identification is not recorded in the whitelist, then the method continues in step S204 by prohibiting the application from registering for the system notification reading permission, after which the method returns to step S201 to continue monitoring the installation status and/or update status of the application in the terminal device.

If the identification of the application is recorded in the whitelist, then the method continues in step S205 by allowing the application to register for the system notification reading permission.

In an exemplary embodiment, the whitelist may be determined by the received usage records of other terminal devices. Specifically, the usage record may be used to obtain one or more types of data, such as the starting time, starting frequency, or running time length, of installed applications pushed by other terminal devices, and the whitelist may be determined according to any one or more types of data, such as the starting time, starting frequency, or running time length, of the installed applications. For example, when the starting frequency is greater than the preset frequency (e.g., 3 times/day), the running time length of each opening or the total time of running is greater than the preset time (e.g., 3 hours), and the starting time conforms to the preset time period (e.g., 9:00 a.m. to 10:00 p.m.), it can be determined that the application is an application commonly used by most users, and the identification of the application can be added to the whitelist accordingly. The identification of the application can be the package name of the application.

From the above, in the process of determining whether the application meets the condition of registering for system notification reading permission, the whitelist is determined according to the usage records pushed by other terminal devices. Besides, the usage records for other users installing the application are taken as a reference of the whitelist, thus meeting the user usage requirements and not causing a mis-disabling of the notification reading permissions.

Figure 3:
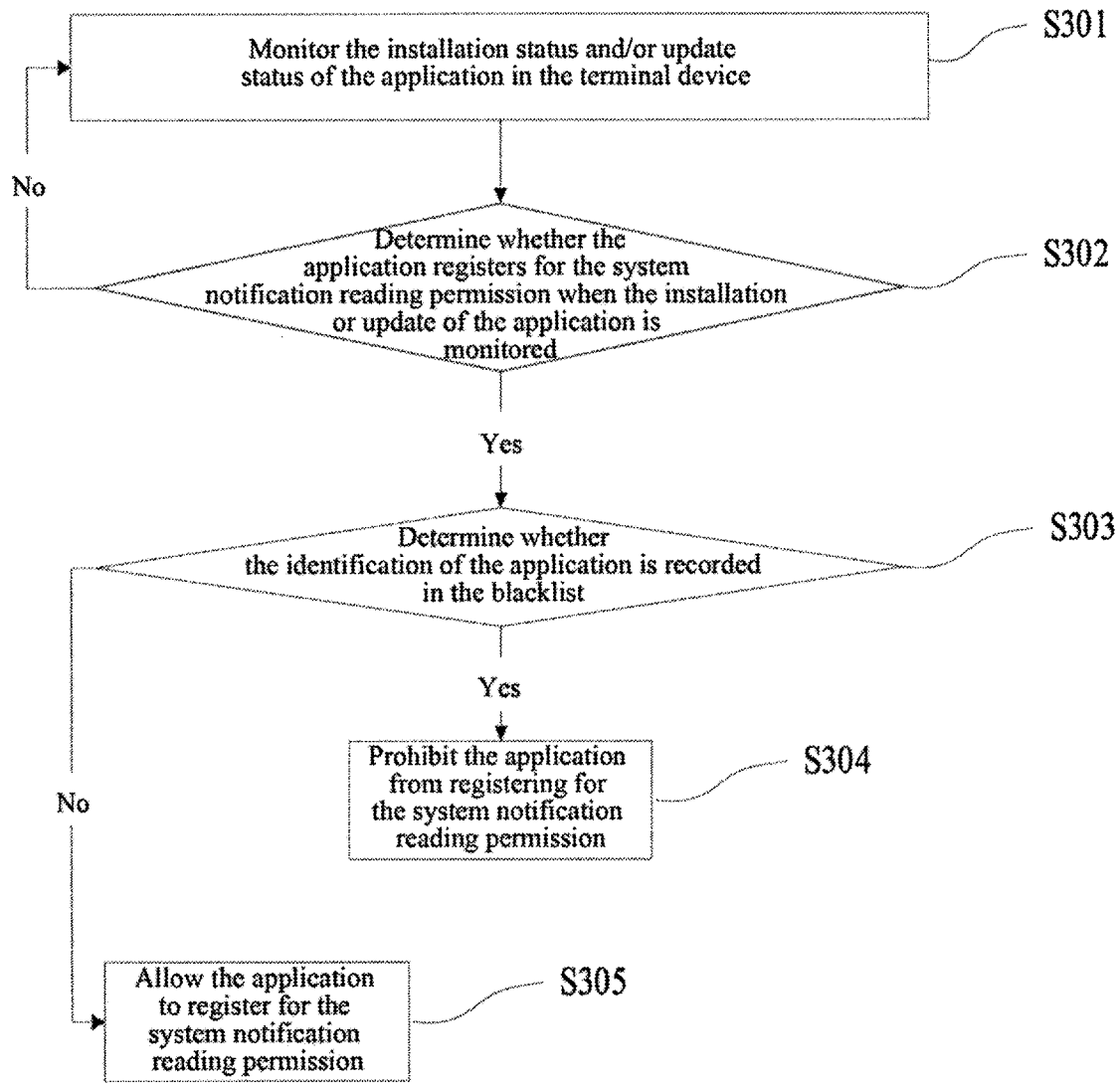
FIG. 3 is a flowchart of a system notification service control method according to another exemplary embodiment of the present application.

FIG. 3 is a flowchart of a system notification service control method according to another exemplary embodiment of the present application. In this exemplary embodiment, determining whether the application meets a registration condition may include determining whether the identification of the application is recorded in a blacklist. If the identification of the application is recorded in the blacklist, then the application does not meet the registration condition, and is prohibited from registering for the system notification reading permission. As shown in FIG. 3, the method may include steps S301-S305.

As shown, the method may begin in step S301 by monitoring the installation status and/or update status of the application in the terminal device.

Based on that monitoring, the method of FIG. 3 continues in step S302 by determining whether the application registers for the system notification reading permission.

If the method determines that the application has not registered, the method returns to step S301 and continues monitoring.

If the method determines that the application registers for the system notification reading permission, then in step S303 the method continues by monitoring whether the identification of the application is recorded in the blacklist.

If the identification of the application is recorded in the blacklist, then the method continues in step S304 by prohibiting the application from registering for the system notification reading permission.

If the identification of the application is not recorded in the blacklist, then the method continues in step S305 by allowing the application to register for the system notification reading permission, after which the method returns to step S301 to continue monitoring the installation status and/or update status of the application in the terminal device.

In embodiments, the blacklist records the identification of the application that is prohibited from registering for the system notification reading permission. In an exemplary embodiment, the application can be added to the blacklist after the application is allowed to register for the system notification reading permission. In embodiments, determining the blacklist may include: if the application meets the registration condition, registering for the system notification reading permission by the application, and monitoring the frequency for reading the system notification by the application within a preset period of time; and if the frequency is greater than a preset frequency (the ratio of the number of notifications read by the application to the number of notifications sent by the system is greater than 0.8), adding the application to the blacklist. That is, when the application registers for the system notification reading permission, the frequency for reading the notification by the application is monitored. For example, an application that frequently reads various types of notifications is added to the blacklist. Alternatively, if the application recorded in the blacklist has registered for the system notification reading permission and cannot be intercepted, the permission can be deleted and deregistered accordingly or the system notification reading permission of the application is disabled through the permission switch. Optionally, the terminal device can upload the blacklist to the server or send it to other terminal devices.

As evident from the above, embodiments provide a blacklist mechanism when determining whether the application is allowed to register for the system notification reading permission. The contents recorded in the blacklist may be determined according to frequencies for reading system notification and/or frequencies for popping-up advertisements by applications, and applications with higher frequencies may be recorded in the blacklist.

Figure 4:
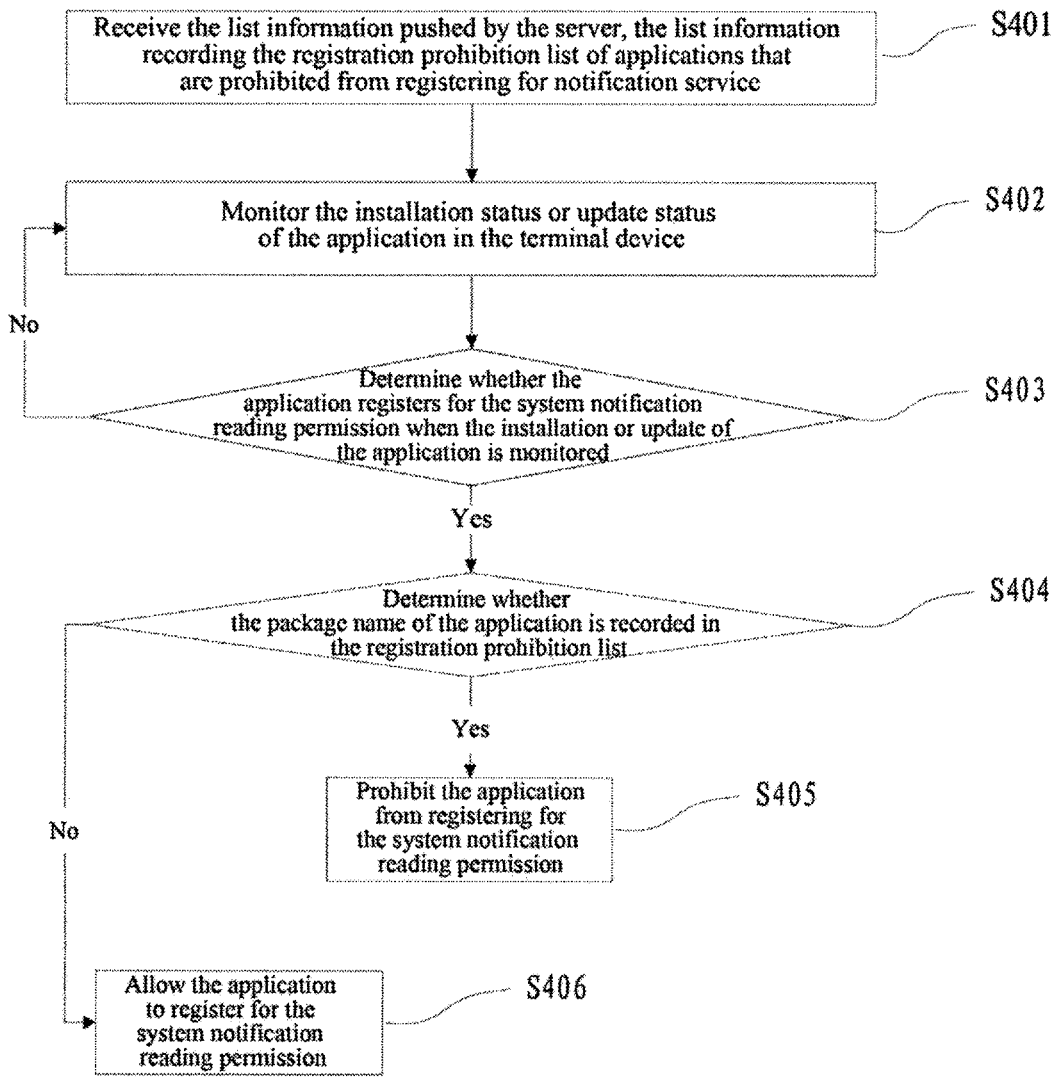
FIG. 4 is a flowchart of a system notification service control method according to yet another exemplary embodiment of the present application.

FIG. 4 is a flowchart of a system notification service control method according to yet another exemplary embodiment of the present application. In this exemplary embodiment, before determining whether the application meets the registration condition, the method may further include receiving list information pushed by the server. The list information records a registration prohibition list of applications that are prohibited from registering for the notification service. The registration prohibition list can be determined by the server according to the frequencies for reading system notification by applications and/or the advertisement pop-up frequencies of applications uploaded by one or more terminal devices, or can be determined by the server according to a blacklist uploaded by one or more terminal devices. Correspondingly, determining whether the application meets the registration condition may include determining whether the package name of the application is recorded in the registration prohibition list. As shown in FIG. 4, the method may include steps S401-S406.

As shown, the method may begin in step S401 by receiving the list information pushed by the server, where the list information records the registration prohibition list of applications that are prohibited from registering for notification service.

The method of FIG. 4 continues in step S402 by monitoring the installation status and/or update status of the application in the terminal device.

Based on that monitoring, the method continues in step S403 by determining whether the application registers for the system notification reading permission.

If the method determines that the application has not registered, the method returns to step S402 and continues monitoring the installation status and/or update status of the application in the terminal device.

If the method determines that the application registers for the system notification reading permission, then in step S404 the method continues by determining whether the package name of the application is recorded in the registration prohibition list.

If the package name of the application is recorded in the registration prohibition list, then the method continues in step S405 by prohibiting the application from registering for the system notification reading permission, after which the method returns to step S402 to continue monitoring the installation status and/or update status of the application in the terminal device.

If the package name of the application is not recorded in the registration prohibition list, then the method continues in step S406 by allowing the application to register for the system notification reading permission.

In embodiments, the registration prohibition list may be determined by the server according to the frequencies for reading system notification by applications and/or the advertisement pop-up frequencies of applications uploaded by one or more terminal devices. Optionally, the server can perform big data analysis on the usage records and running conditions of the applications installed on one or more terminal devices uploaded by the one or more terminal devices, and develop, using a machine learning model, a registration prohibition list of applications that are prohibited from registering for the system notification reading permission. The machine learning model may be developed by the server through training and learning a large number of samples, and can be developed by supervised learning, unsupervised learning, semi-supervised learning, or reinforcement learning. The algorithms used in the learning process may include: regression algorithm, case-based algorithm, regularization algorithm, decision tree algorithm, Bayesian algorithm, kernel-based algorithm, clustering algorithm, association rule algorithm, artificial neural network algorithm, deep learning algorithm, and dimensionality reducing algorithm. In an exemplary embodiment, the frequency for reading system notification by the application uploaded by one or more terminal devices and/or the advertisement pop-up frequency may be used as inputs of the machine learning model, and the corresponding output may be whether the application needs to be prohibited from registering for the system notification reading permission.

As evident from the above, the server may analyze the relevant big data of each application uploaded by the terminal device to determine whether the application needs to be prohibited from registering for the system notification reading permission, thus improving the security of the system notification service and the accuracy of prohibiting from registering for the system notification reading permission, and optimizing the user experience.

Figure 5:
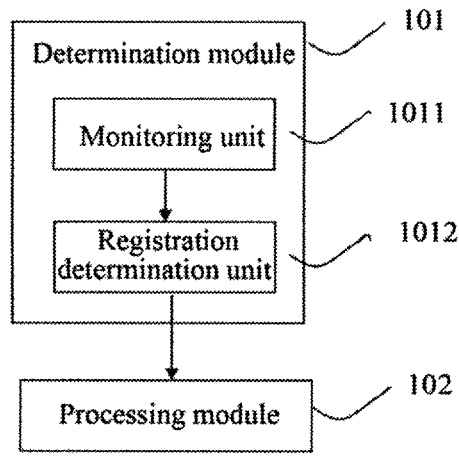
FIG. 5 is a block diagram of a system notification service control apparatus according to an embodiment of the present application.

FIG. 5 is a structural block diagram of a system notification service control apparatus according to an embodiment of the present application. The apparatus may be used to execute embodiments of the system notification service control method disclosed herein, and has corresponding functional modules for implementing the method and beneficial effects. As shown in FIG. 5, the apparatus may include a determination module 101, and a processing module 102.

The determination module 101 may be configured to detect whether an application initiates a registration for a system notification reading permission and in response to detecting that the application initiates the registration for the system notification reading permission, determine whether the application meets a registration condition.

The determination module 101 may include a monitoring unit 1011 which may be configured to detect that an application has started to run and to determine whether the application registers for a system notification reading permission.

Illustratively, the starting and running of an application may include the installation process and/or update process of the application. The application may acquire corresponding permissions during the installation or update process, such as photographing permission, address book access permission, or system notification reading permission. When the application is installed or updated, it may be determined whether the application initiates registration for the system notification reading permission. Illustratively, taking Android™ system as an example, it may be determined whether the application calls the notification management service to register for the system notification reading permission during the installation process of the application.

The determination module 101 may also include a registration determination unit 1012 configured to determine whether the application meets a registration condition when the application initiates the registration for the system notification reading permission.

In an exemplary embodiment, if monitoring unit 1011 does not detect the registration for the system notification reading permission during the installation or update process of the application, the flow ends. If monitoring unit 1011 detects that the registration for the system notification reading permission is initiated during the installation or update of the application, registration determination unit 1012 may determine whether the application meets the registration condition. Herein, it may be detected that the application registers for the service process in the notification management service. The registration condition is a basis preset for determining whether the current application can register for the system notification reading permission.

Optionally, registration determination unit 1012 may determine whether the application meets the registration condition by determining whether the identification of the application is recorded in a whitelist. For the whitelist, before determining whether the application meets the registration condition, usage records pushed by other terminal devices may be acquired and used to create a whitelist that contains the application identification according to the usage record, and the whitelist is stored. Acquiring usage records of other terminal devices may include acquiring any one or more types of data, such as starting time, starting frequency, or running time length, of installed applications pushed by other terminal devices.

Optionally, registration determination unit 1012 may determine whether the application meets the registration condition by determining whether the identification of the application is recorded in a blacklist. Optionally, before determining whether the application meets the registration condition, the method may further include receiving list information pushed by the server or other terminal device. The list information records a registration prohibition list of applications that are prohibited from registering for notification services. The server may determine the registration prohibition list based on any one or more types of data, such as the frequencies for reading system notification by applications and/or the advertisement pop-up frequencies uploaded by one or more terminal devices. For example, an embodiment my provide a process for generating a blacklist that involves: if the application meets the registration condition, performing registration for the system notification reading permission of the application; monitoring within a preset time period the frequency for reading the system notification by the application; and if the frequency is greater than the preset frequency, adding the application to the blacklist.

Optionally, determining whether the application meets the registration condition may also include receiving the list information sent by the server and using the contents recorded in the list information as the basis for determining whether the application can register for the system notification reading permission. Illustratively, an embodiment may receive the list information pushed by the server. The list information records a registration prohibition list of applications that are prohibited from registering for notification services. The server may determine the registration prohibition list based on one or more types of data, such as the frequencies for reading system notification by applications and/or the advertisement pop-up frequencies of applications uploaded by one or more terminal devices.

The processing module 102 may be configured to prohibit the application from registering for the system notification reading permission when the application does not meet the registration condition.

In an exemplary embodiment, when registration determination unit 1012 determines that the application does not meet the registration condition, processing module 102 may prohibit the application from registering for the system notification reading permission. For example, the function method in the notification management service called by the application can be intercepted and shielded to prohibit the application from registering for the service process. Optionally, when a whitelist is used as a registration condition, if the application does not meet the registration condition, prohibiting the application from registering for the system notification reading permission may include prohibiting the application from registering for the system notification reading permission if the identification of the application is not recorded in the whitelist. Optionally, when a blacklist is used as a registration condition, prohibiting the application from registering for the system notification reading permission if the application does not meet the registration condition may include prohibiting the application from registering for the system notification reading permission if the identification of the application is recorded in the blacklist. When the list pushed by the server is used as a registration condition, determining whether the application meets the registration condition may include determining whether the identification (such as package name) of the application is recorded in the registration prohibition list.

As evident from the above content, when monitoring unit 1011 detects that an application has started to run, and determines that the application registers for the system notification reading permission, and the registration determination unit 1012 then determines that the application does not meet the registration condition, the processing module 102 prohibits the application from registering for the system notification reading permission. Thus, an illegal application is avoided from self-starting when being awakened by the system notification after registering for notification reading permission, the operating efficiency of the system is improved, and the power consumption of the terminal device is reduced.

In an exemplary embodiment, the registration determination unit 1012 may be configured to: determine whether the identification of the application is recorded in a whitelist.

The processing module 102 may be configured to: if the identification of the application is not recorded in the whitelist, prohibit the application from registering for the system notification reading permission.

In an exemplary embodiment, the registration determination unit 1012 may be further configured to, before determining whether the application meets a registration condition, acquire a usage record pushed by another terminal device, determine a whitelist containing application identifications according to the usage record, and store the whitelist in computer memory.

In an exemplary embodiment, the registration determination unit 1012 may be configured to acquire the starting time, the starting frequency, and/or the running time length of installed applications pushed by other terminal devices.

The processing module 102 may be configured to: determine a whitelist according to the starting time, the starting frequency, and/or the running time length of the installed application.

In an exemplary embodiment, the registration determination unit 1012 may be configured to: determine whether the identification of the application is recorded in a blacklist.

The processing module 102 may be configured to: if the identification of the application is recorded in the blacklist, prohibit the application from registering for the system notification reading permission.

In an exemplary embodiment, the processing module 102 may be further configured to: if the application meets the registration condition, register for the system notification reading permission of the application, monitor the frequency for reading a system notification by the application within a preset time period, and add the application to the blacklist if the frequency is larger than a preset frequency.

In an exemplary embodiment, the registration determination unit 1012 may be further configured to: receive list information pushed by a server before determining whether the application meets the registration condition, wherein the list information records a registration prohibition list of applications that are prohibited from registering for notification services. The server may determine the registration prohibition list based on frequencies for reading system notification by applications and/or the advertisement pop-up frequencies uploaded by one or more terminal devices.

The processing module 102 may be configured to: determine whether the package name of the application is recorded in the registration prohibition list.

Figure 6:
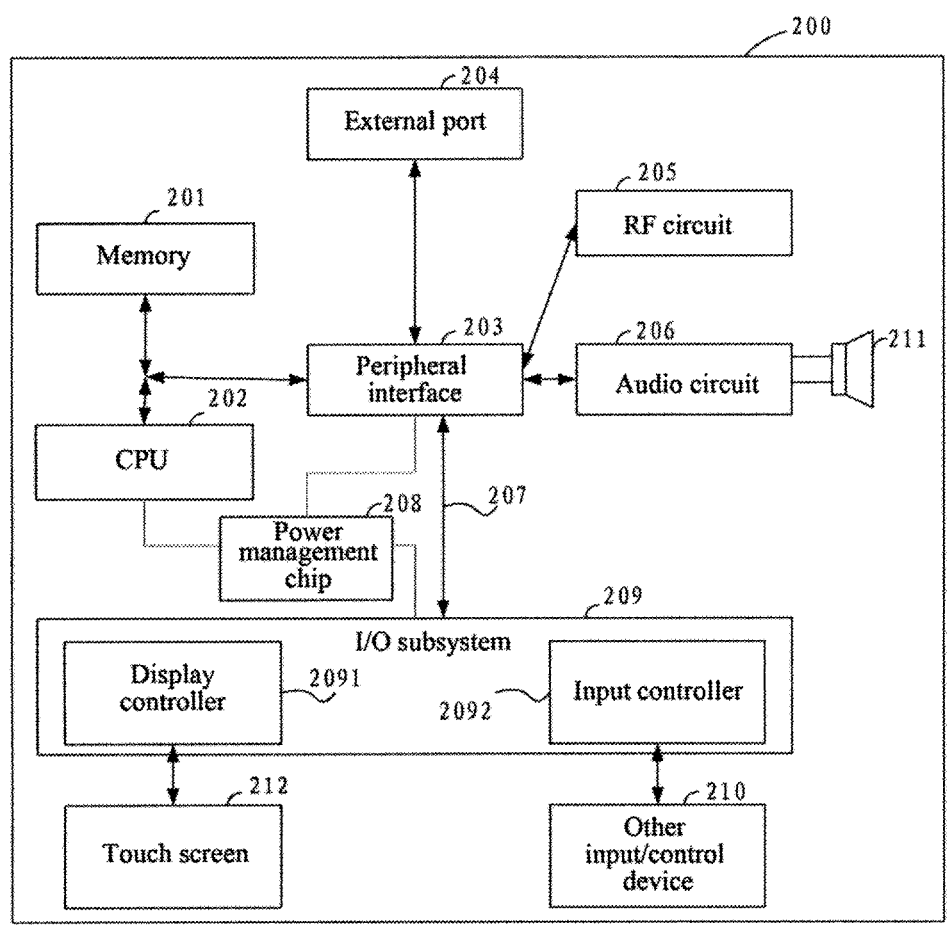
FIG. 6 is a schematic structural diagram of a terminal device according to an embodiment of the present application.

An embodiment provides a terminal device on the basis of the above embodiments. FIG. 6 is a schematic structural diagram of a terminal device according to an embodiment of the application. As shown in FIG. 6, a terminal device 200 may include a memory 201, a central processing unit (CPU) 202, a peripheral interface 203, a radio frequency (RF) circuit 205, an audio circuit 206, a speaker 211, a power management chip 208, an input/output (I/O) subsystem 209, a touch screen 212, other input/control devices 210, and an external port 204. These components may be connected via one or more communication buses or signal lines 207.

It should be understood that the illustrated terminal device 200 is only one example of a terminal device, and the terminal device 200 may have more or fewer components than shown in the figure, may combine two or more components, or may have different component configurations. The various components shown in the figures may be implemented in hardware including one or more signal processing and/or application specific integrated circuits, software, or a combination of hardware and software. In an exemplary embodiment, the terminal device is a mobile phone.

The memory 201 can be accessed by CPU 202, peripheral interface 203, and other components. The memory 201 can include high-speed random access memory and can also include non-volatile memory such as one or more disk memory devices, flash memory devices, or other volatile solid state memory devices. A computer program executable on a processor may be stored on the memory.

The CPU 202 may execute the system notification service control method in any embodiment of the present application when executing the computer program.

The peripheral interface 203 can connect the input and output peripherals of the device to the CPU 202 and the memory 201.

The I/O subsystem 209 can connect input/output peripherals on the device, such as a touch screen 212 and other input/control devices 210, to the peripheral interface 203. The I/O subsystem 209 may include a display controller 2091 and one or more input controllers 2092 for controlling other input/control devices 210. Among them, one or more input controllers 2092 receive electrical signals from other input/control devices 210 or send electrical signals to other input/control devices 210. Other input/control devices 210 may include physical buttons (push buttons, rocker buttons, etc.), dials, slide switches, joysticks, and click rollers. It is worth noting that the input controller 2092 can be connected to any of the following: a keyboard, an infrared port, a USB interface, and/or a pointing device such as a mouse.

The touch screen 212 may be an input interface and an output interface between the user terminal and the user, and may display visual output to the user. The visual output may include graphics, text, icons, videos, etc.

The display controller 2091 in the I/O subsystem 209 may receive electrical signals from the touch screen 212 and/or send electrical signals to the touch screen 212. The touch screen 212 may detect the contact on the touch screen, and the display controller 2091 may convert the detected contact into interaction with the user interface object displayed on the touch screen 212, i.e., implementing man-machine interaction. The user interface object displayed on the touch screen 212 may be an icon for running a game, an icon connected to a corresponding network, etc. It is worth noting that the device may also include a light mouse, which is a touch-sensitive surface that does not display visual output or an extension of the touch-sensitive surface formed by the touch screen.

The RF circuit 205 may be mainly used to establish communication between the mobile phone and the wireless network (i.e., the network side) to implement data reception and transmission between the mobile phone and the wireless network, such as sending and receiving short messages, e-mail, etc. The RF circuit 205 may receive and transmit RF signals, which are also called electromagnetic signals. The RF circuit 205 may convert electrical signals into electromagnetic signals or electromagnetic signals into electrical signals, and may communicate with communication networks and other devices through the electromagnetic signals. The RF circuit 205 may include known circuits for performing these functions, including, but not limited to, an antenna system, an RF transceiver, one or more amplifiers, a tuner, one or more oscillators, a digital signal processor, a Coder-DECoder (CODEC) chipset, a subscriber identity module (sim), and the like.

The audio circuit 206 may be mainly used to receive audio data from the peripheral interface 203, convert the audio data into an electrical signal, and send the electrical signal to the speaker 211.

The speaker 211 may be used to restore the voice signal received by the cell-phone from the wireless network through the RF circuit 205 to sound and play the sound to the user.

The power management chip 208 may be used to supply power and manage power for the hardware connected to the peripheral interface, the CPU 202, and the I/O subsystem.

An embodiment of the present application provides a non-transitory computer-readable storage medium containing instructions executable by a terminal device. The instructions executable by the terminal device, when executed by a processor of the terminal device, may implement any of the system notification service control methods provided in the present application. The system notification service control method may include:

detecting whether an application initiates a registration for a system notification reading permission;

in response to detecting that the application initiates the registration for the system notification reading permission, determining whether the application meets a registration condition; and prohibiting the application from registering for the system notification reading permission when the application does not meet the registration condition.

In an exemplary embodiment, determining whether the application meets a registration condition may include:

determining whether an identification of the application is recorded in a whitelist;

correspondingly, prohibiting the application from registering for the system notification reading permission when the application does not meet the registration condition comprises:

when the identification of the application is not recorded in the whitelist, the application is prohibited from registering for the system notification reading permission.

In an exemplary embodiment, before determining whether the application meets the registration condition, the method may further include:

acquiring a usage record pushed by at least one other terminal device, determining a whitelist containing application identifications according to the usage record, and storing the whitelist.

In an exemplary embodiment, acquiring a usage record of at least one other terminal device may include:

acquiring any one or more types of data, such as a starting time, a starting frequency, and/or a running time length, of installed applications pushed by the at least one other terminal device;

correspondingly, determining a whitelist containing application identifications according to the usage record may include:

determining a whitelist according to any one or more types of data of the starting time, the starting frequency, and/or the running time length of the installed applications.

In an exemplary embodiment, determining whether the application meets a registration condition may include:

determining whether the identification of the application is recorded in a blacklist;

correspondingly, prohibiting the application from registering for the system notification reading permission when the application does not meet the registration condition comprises:

when the identification of the application is recorded in the blacklist, the application is prohibited from registering for the system notification reading permission.

In an exemplary embodiment, when the application meets the registration condition, registration for the system notification reading permission of the application is performed, and frequency for reading system notification by the application is monitored within a preset time period; and when the frequency is greater than a preset frequency, the application is added to the blacklist.

In an exemplary embodiment, before determining whether the application meets a registration condition, the method may further include:

receiving list information pushed by a server, wherein the list information records a registration prohibition list of applications that are prohibited from registering for notification services, and the registration prohibition list is determined by the server based on frequencies for reading system notification by applications and/or advertisement pop-up frequencies of applications uploaded by one or more terminal devices;

correspondingly, determining whether the application meets a registration conditions comprises:

determining whether a package name of the application is recorded in the registration prohibition list.

In embodiments, a non-transitory computer readable storage medium may be any of various types of memory devices or storage devices.

The term "storage medium" is intended to include: installation media such as CD-ROM, floppy disk or tape device; computer system memory or random access memory such as DRAM, DDR RAM, SRAM, EDO RAM, Rambus ram, etc.; non-volatile memory such as flash memory, magnetic media (e.g., hard disk or optical storage); registers or other similar types of memory elements, etc. The storage medium may also include other types of memory or combinations thereof. In addition, the storage medium may be located in a first computer system in which the program is executed, or may be located in a different second computer system connected to the first computer system through a network such as the Internet. The second computer system may provide program instructions to the first computer for execution. The term "storage medium" may include two or more storage media that may reside in different locations (e.g., in different computer systems connected through a network). The storage medium may store program instructions (e.g., specifically embodied as a computer program) executable by one or more processors.

Embodiments of the application may be applied for controlling the system notification service of a terminal device. The methods may be implemented by the terminal device provided in the embodiment of the application. The system notification service control apparatus may be implemented by software and/or hardware.

Embodiments of the present application may provide a non-transitory computer readable storage medium containing computer-executable instructions. The computer-executable instructions of the storage medium are not limited to the operation of the system notification service control method described above, but can also be used to perform related operations in the system notification service control method provided by any embodiment of the present invention.

The system notification service control apparatus, the storage medium and the terminal device provided in the above embodiments may execute the corresponding system notification service control method, and may have corresponding functional modules and beneficial effects for executing the method. Technical details that are not described in the above embodiments may be similar to those discussed with regard to embodiments relating to the system notification service control method.

It will be apparent to those of ordinary skill in the related art that the modules/units in all of or some of the steps, systems, and apparatus of the methods disclosed herein can be implemented as software, firmware, or appropriate combinations thereof. With hardware implementation, the division of the functional modules/units described herein does not necessarily correspond to the division of the physical units; for example, a physical component can have multiple functions, or a function or step can be executed by the cooperation of several physical components. A few components or all of the components can be implemented by a processor, such as by the software of a digital signal processor or a microprocessor, or can be implemented as an integrated circuit, such as a specialized integrated circuit. This software can be distributed on a computer-readable medium; the computer-readable medium can comprise a computer storage medium (or non-transient medium) and a communication medium (or transient medium). It is well known to those of ordinary skill in the art that communication media typically include computer readable instructions, data structures, program modules, or other data in modulated data signals such as carrier wave or other transmission mechanism, and may include any information delivery media.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

Although the embodiments above have been described in considerable detail, numerous variations and modifications will become apparent to those skilled in the art once the above disclosure is fully appreciated. It is intended that the following claims be interpreted to embrace all such variations and modifications.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

What is claimed is:

1. A system notification service control method, comprising:
 detecting whether an application initiates a registration for a system notification reading permission;
 in response to detecting that the application initiates the registration for the system notification reading permission, determining whether the application meets a registration condition; and prohibiting the application from registering for the system notification reading permission when the application does not meet the registration condition;
wherein the method further comprises:
receiving list information from a server, wherein the list information records a registration prohibition list of applications that are prohibited from registering for notification services, and the registration prohibition list is determined by the server based on information of applications uploaded by one or more terminal devices which comprises any one or more of frequencies of reading system notification by the applications, or frequencies of advertisement pop-up of the applications;
wherein determining whether the application meets the registration conditions comprises:
determining whether a package name of the application is recorded in the registration prohibition list; and
whether prohibiting the application from registering for the system notification reading permission when the application does not meet the registration condition comprises:
prohibiting the application from registering for the system notification reading permission when the package name of the application is recorded in the registration prohibition list.

2. The method according to claim 1, further comprising: determining whether the application initiates the registration for the system notification reading permission when detecting that the application has started to run.

3. The method according to claim 2, wherein detecting that the application has started to run comprises detecting that the application is installed or updated.

4. The method according to claim 1, wherein detecting that the application initiates the registration for the system notification reading permission comprises: detecting that the application calls a system notification management service when the application is installed or updated.

5. The method according to claim 1, wherein detecting that the application initiates the registration for the system notification reading permission comprises: detecting that the application registers for a service process in a system notification management service for listening system notification information.

6. The method according to claim 1, further comprising: determining whether an application has registered for the system notification reading permission when detecting that the application has started to run.

7. The method according to claim 1, wherein determining whether the application meets a registration condition comprises determining whether an identification of the application is recorded in a whitelist; and
wherein prohibiting the application from registering for the system notification reading permission when the application does not meet the registration condition comprises prohibiting the application from registering for the system notification reading permission when the identification of the application is not recorded in the whitelist.

8. The method according to claim 7, wherein the whitelist comprises any one or more of:
a whitelist received from a server;
a whitelist received from another terminal device;
a whitelist input by a user;
a whitelist generated by a terminal device according to a usage record of applications in the terminal device; or
a whitelist generated by a terminal device according to a usage record of applications received from at least one other terminal device.

9. The method according to claim 7, further comprising:
receiving a usage record of applications from at least one other terminal device, determining the whitelist containing application identifications according to the usage record, and storing the whitelist.

10. The method according to claim 8, wherein the usage record of applications comprises any one or more of starting time, starting frequency, or running time length of applications.

11. The method according to claim 1, wherein determining whether the application meets the registration condition comprises determining whether the identification of the application is recorded in a blacklist; and
wherein prohibiting the application from registering for the system notification reading permission when the application does not meet the registration condition comprises prohibiting the application from registering for the system notification reading permission when the identification of the application is recorded in the blacklist.

12. The method according to claim 11, wherein the blacklist comprises any one or more of:
a blacklist received from a server;
a blacklist received from another terminal device;
a blacklist input by a user;
a blacklist generated by a terminal device according to information of applications monitored by the terminal device; or
a blacklist generated by a terminal device according to information of applications monitored and sent by at least one other terminal device.

13. The method of claim 12, wherein the terminal device generates the blacklist according to monitored information of the applications by any one or more of:
determining frequencies of reading system notification by the applications within a first preset time period according to the monitored information of the applications, and adding an application with the frequency larger than a first preset frequency into the blacklist; or
determining frequencies of advertisement pop-up of the applications within a second preset time period according to the monitored information of the applications, and adding an application with the frequency larger than a second preset frequency into the blacklist.

14. The method according to claim 11, further comprising:
performing registration for the system notification reading permission of the application when the application meets the registration condition;
monitoring a frequency of reading system notification by the application within a preset time period; and
adding the application into the blacklist when the frequency is greater than a preset frequency.

15. The method of claim 13, wherein the frequency of reading system notification by an application within the first preset time period is indicated by a ratio of a number of notifications read by the application to a number of notifications sent by the system within the first preset time period, or by the number of notifications read by the application within the first preset time period.

16. The method according to claim 1, wherein the application does not meet the registration condition when any one or more of the following conditions is met:

a frequency of reading system notification by the application within a first preset time period is larger than a first preset frequency;

a frequency of advertisement pop-up of the application within a second preset time period is larger than a second preset frequency;

an identification of the application is recorded in a blacklist;

the identification of the application is not recorded in a whitelist; or the identification of the application is recorded in the blacklist and is not recorded in the whitelist, wherein the blacklist is a list of applications that are prohibited from registering for the system notification reading permission, and the whitelist is a list of applications that are permitted to register for the system notification reading permission.

17. The method according to claim 1, wherein prohibiting the application from registering for the system notification reading permission comprises intercepting and shielding a function method called by the application in a system notification management service.

18. A terminal device, comprising: a processor, and a memory storing a computer program that is executable by the processor to perform steps of:

detecting whether an application initiates a registration for a system notification reading permission;

in response to detecting that the application initiates the registration for the system notification reading permission, determining whether the application meets a registration condition; and prohibiting the application from registering for the system notification reading permission when the application does not meet the registration condition;

wherein when the processor executes the computer program, the processor further performs a step of:

receiving list information from a server, wherein the list information records a registration prohibition list of applications that are prohibited from registering for notification services, and the registration prohibition list is determined by the server based on information of applications uploaded by one or more terminal devices which comprises any one or more of frequencies of reading system notification by the applications, or frequencies of advertisement pop-up of the applications;

wherein determining whether the application meets the registration conditions comprises:

determining whether a package name of the application is recorded in the registration prohibition list; and whether prohibiting the application from registering for the system notification reading permission when the application does not meet the registration condition comprises:

prohibiting the application from registering for the system notification reading permission when the package name of the application is recorded in the registration prohibition list.

19. A non-transitory computer-readable storage medium, comprising: instructions that are executable by a device processor to perform steps of:

detecting whether an application initiates a registration for a system notification reading permission;

in response to detecting that the application initiates the registration for the system notification reading permission, determining whether the application meets a registration condition; and prohibiting the application from registering for the system notification reading permission when the application does not meet the registration condition;

wherein the instructions, when executed by the device processor, cause the device processor to further perform a step of:

receiving list information from a server, wherein the list information records a registration prohibition list of applications that are prohibited from registering for notification services, and the registration prohibition list is determined by the server based on information of applications uploaded by one or more terminal devices which comprises any one or more of frequencies of reading system notification by the applications, or frequencies of advertisement pop-up of the applications;

wherein determining whether the application meets the registration conditions comprises:

determining whether a package name of the application is recorded in the registration prohibition list; and whether prohibiting the application from registering for the system notification reading permission when the application does not meet the registration condition comprises:

prohibiting the application from registering for the system notification reading permission when the package name of the application is recorded in the registration prohibition list.

* * * * *